E. T. P. GOODYEAR.
GOGGLES.
APPLICATION FILED MAY 19, 1919.
1,397,250.
Patented Nov. 15, 1921.
3 SHEETS—SHEET 1.
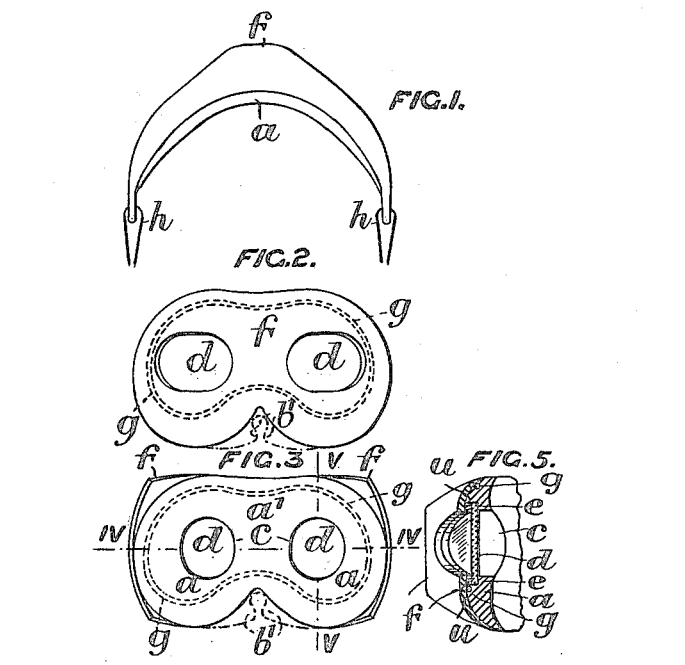
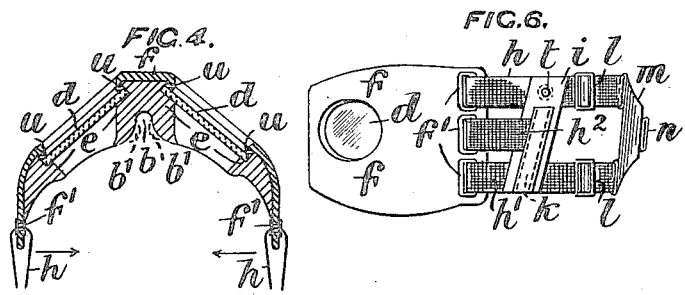
Inventor
Edward T. P. Goodyear,
By- Henry Orth Jr.
Atty

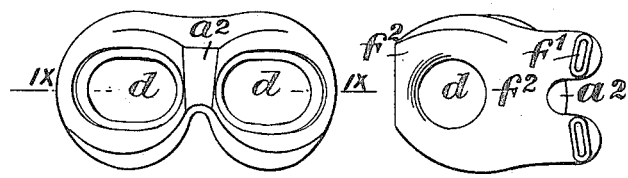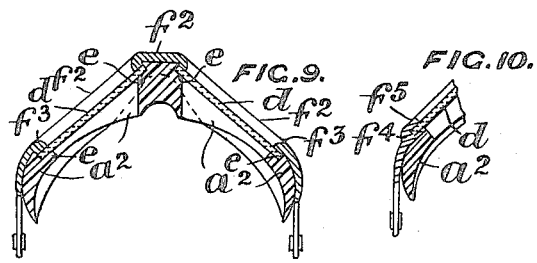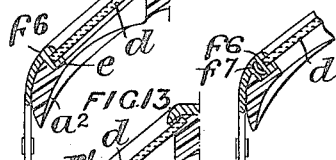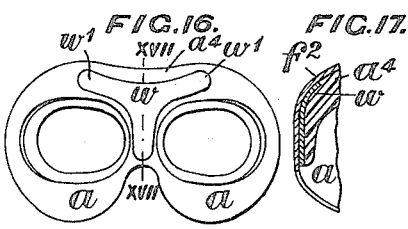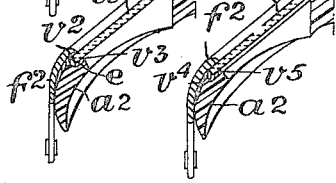

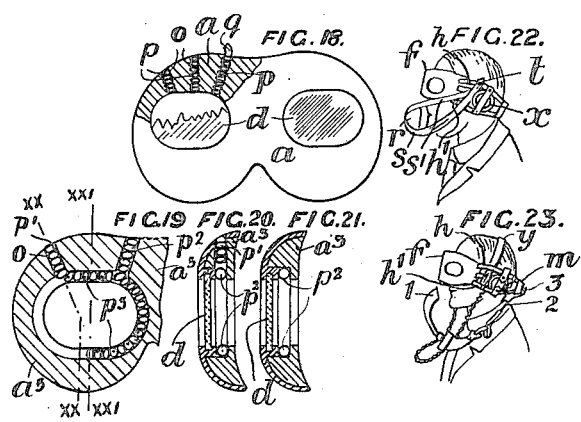

UNITED STATES PATENT OFFICE.

EDWARD THOMAS PARSONS GOODYEAR, OF REIGATE HEATH, ENGLAND.

GOGGLES.

1,397,250.  Specification of Letters Patent.  Patented Nov. 15, 1921.

Application filed May 19, 1919. Serial No. 298,080.

*To all whom it may concern:*

Be it known that I, EDWARD THOMAS PARSONS GOODYEAR, subject of the King of Great Britain, residing at Colley Corner, Reigate Heath, in the county of Surrey, England, have invented certain new and useful Improvements in and Connected with Goggles, of which the following is a specification.

This invention relates to improvements in and connected with goggles and has for objects to increase the angle of vision, to prevent the steaming of the glasses and consequently to increase the range of vision and the comfort of the wearer, to provide improved means for fitting the goggles around the eye sockets of the wearer and to securely and comfortably hold the goggles in place on the wearer's head.

According to this invention the goggles comprise a pad of resilient material, such as real or artificial spongy rubber, adapted or molded to fit against the brow, around the eye sockets and over the nose of the wearer, and provided with apertures of approximately oval shape to receive glasses or windows, each aperture extending from the inner corner of the eye of the wearer to some distance to the rear of the outer corner of the eye, the said glasses or windows being mounted angularly to each other and in or in front of the said apertures in the said pad, clear of the eye lashes of the wearer, each glass, consequently, extending from near the nose to some distance to the rear of the outer corner of the eye, a band, support, foundation or reinforcement for the resilient pad and means such as straps or webbing, for attaching the goggles to the wearer's head. By this arrangement of the glasses or windows, the angle of vision may be 90° or even more for each eye instead of, as is usual, about 40°, that is to say, the angle of vision for both eyes together is about 180°. Moreover, owing to the positioning of the glasses and the consequent angular formation of the pad and its band or support, the wearer's head receives a contour adapted to afford less resistance to the air in his passage or flight, particularly at high speed, than has been the case with goggles as constructed hitherto. The glasses or windows may be fixed or they may be detachably mounted in sockets in or on the pad, if it be desired to substitute glasses of different colors. The resilient pad is also conveniently thickened and/or reinforced in front of the recess for the nose so as to afford protection to the wearer's nose, brow, and/or eyes, in case of accidents. The resilient pad or the support or foundation may also be reinforced by a frame of pliable but not necessarily elastic, material, such as an oblong loop or ring of copper wire which is yielding enough to accommodate itself to the contour of the wearer's forehead, nose, eye sockets and cheek bones and yet retains its shape when removed from the wearer's head. The harness suitably comprises inextensible or elastic straps or webbing connected at each side to the support or foundation above and below the ears of the wearer to insure a perfect fit, and extending around the back of the head and, obviously, any appropriate means may be employed for adjusting the effective lengths of the straps or webbing. The straps above and below the ears are connected by flexible pads, bands, struts or the like in front of and/or behind the ears of the wearer. The struts may, however, be dispensed with in some constructions as the band, support or foundation may be sufficiently stiff in itself. Moreover, the straps or webbing may also be connected to a pad at the back of the wearer's head or they may intersect or cross each other. If desired, the pad may be in two pieces detachably connected together by a hook and eye or other appropriate fastening means. The harness for the support or foundation for the resilient pad is, preferably, permanently attached to the said support or the latter may be furnished with studs, hooks or the like and the free ends of the straps or webbing are provided with buttonholes, loops or the like for detachably connecting the straps or webbing to the said support. The resilient pad or the support or both may be furnished with holes or ducts for the ventilation of the spaces between the wearer's eyes and the glasses or windows. The goggles may also be adapted to serve as or be combined with a gas mask and the nose clip may be formed in one or attached thereto. For example, the nose clip is conveniently actually formed in the resilient pad, the walls of the recess being for this purpose provided with projections of such formation as to press with an easy, but well distributed pressure, on the nostrils of the wearer so as to prevent the wearer from inhaling, through the nose, any poisonous or deleterious gas or vapor. It is, however, obvious that an independent nose clip may be employed if desired. Moreover, the conformation of the resilient pad is such as to entirely exclude the ingress of any gas or irritant of a lachrymatory or otherwise deleterious nature. The respirator employed may be of any suitable construction and form for military and mine-rescue work, and if in the form of a metal receptacle to contain the filter and chemicals is conveniently mounted or supported in a cup or skeleton cup or cradle made of webbing or the like and provided with a strap or straps on each side for connecting by press button studs or other suitable fastenings to a portion of the harness, before referred to, for attachment to the head of the wearer and in such a position that the mouthpiece is supported and may be held in the wearer's mouth without effort. Means may also be provided for supporting telephone instruments on the harness.

And in order that the invention may be more readily understood, reference will be made to the accompanying drawings in which:

Figure 1 of the accompanying drawings is a plan view of a pair of goggles.

Fig. 2 is a front elevation.

Fig. 3 is a rear elevation thereof.

Fig. 4 is a plan section on the line IV—IV Fig. 3.

Fig. 5 is a transverse section on the line V—V Fig. 3, and

Fig. 6 is a side elevation.

Fig. 7 is a front elevation of a slightly modified construction of goggles with the band or support removed.

Fig. 8 is a side view of this modification and

Fig. 9 is a plan section on the line IX—IX, Fig. 7, but with the band or support in place.

Figs. 10 to 15 inclusive are detail plan sections showing other modifications.

Fig. 16 is a front view of the goggles with the band or support removed and with a reinforcement or protection for the eyes and nose of the wearer and Fig. 17 is a section on the line XVII—XVII of Fig. 16.

Fig. 18 is a part sectional elevation of a resilient pad with means for ventilating the cavities behind the glasses or windows.

Fig. 19 is a part sectional front elevation of a modified arrangement for ventilating and Figs. 20 and 21 are sections on the lines XX—XX and XXI—XXI of Fig. 19.

Fig. 22 is a view on a smaller scale showing the goggles adapted to be used as a gas mask, attached to the wearer's head with telephone receiver and respirator and Fig. 23 is a somewhat similar view of a modified form of harness but with the telephone receiver and transmitter.

Referring to Figs. 1 to 6 inclusive, the goggles comprise a pad $a$ of resilient material such as real or artificial spongy rubber and which is molded in such a manner as to be thickest in the middle and to taper toward each end. The pad also fits around the eye sockets, the central portion $a'$ being thick, and furnished at the rear with a recess $b$ to receive the nose of the wearer. If the goggles are to be used as a gas mask, the opening of the recess is restricted by providing it with a small projection $b'$ (shown in dotted lines Figs. 2, 3 and 4) molded on each side, these small projections $b'$ being adapted to press against the nostrils with an easy, but well distributed, pressure. The apertures $c$ are so arranged and formed as to permit rays of light from relatively near objects in front to reach both the eyes and to also allow of objects being visible at practically right angles to the line of sight so that the wearer may be able to see all objects within a complete arc of 180° or say 90° for each eye without having to move his head. For this purpose, the apertures are set relatively close together and extend rearwardly well beyond the outer corners of the wearer's eyes. The glasses or windows $d$ are mounted in grooves or recesses $e$ in the resilient pad $a$ clear of the eyelashes of the wearer, and when the goggles are in position on the wearer's head, the glasses will be approximately at right angles to each other as best seen in Fig. 4, instead of being more or less in the same plane as has been usually the case with goggles heretofore in use and which of course, resulted in greatly reducing the angle of vision. In this construction the glasses or windows $d$ are dropped into recesses and secured therein by small rings or fillets $u$ fixed in place by cement or india-rubber solution, but obviously the glasses may be forced into grooves in the material of which the pad is made. If grooves be employed, the glasses or windows may be cemented therein or they may be held in position by the elasticity of the material of which the pad is made and in that case, it is obvious that the glasses may be removed and replaced by others of a different color or kind if desired. Later on, other modifications of the means for securing the glasses in position will be described and illustrated. In order to strengthen or reinforce the elastic pad $a$, the latter is provided with a band, support or foundation $f$, conveniently made of reinforced india-rubber or other appropriate material, and cemented or solutioned thereto. This foundation $f$ suitably overlaps the ends of the pad $a$ and is furnished with slots reinforced by oblong eyelets $f'$ (Figs. 4 and 6). If desired, and as shown in Fig.

3, the pad $a$ is reinforced by a loop or frame of copper wire $g$ (Figs. 2, 3 and 5) located and also, if desired, cemented into a recess made in the pad to receive it. The band or foundation $f$ also incloses or covers the said reinforcing loop or frame $g$ and the latter while being sufficiently flexible to permit the pad $a$ to conform to the contour of the wearer's features, keeps the pad in shape when removed from the wearer's head. Unless, however, the reinforcing wire $g$ be employed, the pad $a$ is of such a shape as to leave the ends somewhat far apart until strapped on to the wearer's head and, consequently, when in position, the ends are brought closer together in the direction of the arrows (Fig. 4) with the result that the windows $d$ form a smaller angle with each other and consequently afford a greater angle of vision (say 180° in all or 90° for each eye) than would appear from the drawing. The harness illustrated in Fig. 6 comprises three bridle straps $h$ $h'$ and $h^2$ on each side but the middle one $h^2$ may be dispensed with, if desired. These straps may, if desired, be connected together in front of the wearer's ears by a pad or strap $i$ which may be stiffened by a reinforcement or strut $k$ of whalebone. If desired these straps $h$ and $h'$ may also be connected behind the wearer's ear by other pads or straps similar to that marked $i$. The straps $h$ and $h'$ are adapted to go respectively above and below the ear of the wearer and to thus prevent the goggles from becoming displaced or slipping down, irrespective of the shape of the wearer's head. Furthermore, a perfect fit of the resilient pad $a$ around the sockets of the wearer's eyes is insured. The said straps may be elastic and extend around the back of the wearer's head, so that the goggles are easily slipped on and off without the use of hooks and eyes, buckles or other fastenings and obviously any appropriate means, diagrammatically indicated at $l$, may be employed for adjusting the effective lengths of the straps $h$ and $h'$. The straps $h$ and $h'$ may also cross each other at the back and be provided with a pad where they intersect or, as shown, each pair of straps $h$ $h'$ may be connected to a small pad or reinforced yoke, such as $m$ (Fig. 6) one of which pads is furnished, say, with an eye or loop $n$, while the other is provided with a hook to correspond as will be clear without further illustration. It is also obvious that instead of permanently attaching the straps to the goggles or the foundation or support $f$, the latter may be provided with studs, hooks or the like, and the free ends of the straps or webbing are furnished with button-holes, loops or the like for detachably connecting the straps or webbing to the foundation.

In the construction shown in Figs. 7, 8 and 9, the band, support or foundation $f^2$ (only shown in Figs. 8 and 9) is molded to fit the contour of the front of the correspondingly molded resilient or elastic pad $a^2$ (Figs. 7, 8 and 9) and is cemented or solutioned thereto. As shown, the resilient pad is provided with recesses $e$ to receive the glasses $d$ and the band $f^2$ is provided with projections or beads $f^3$ all around its openings to form fillets which project into the said recesses and being also in contact with the glasses, keep them in position. Preferably, the glasses are cemented into the recesses $e$ and the beads $f^3$ may also be cemented or solutioned in the recesses and to the glasses.

Fig. 10 shows the band, support or foundation $f^4$ provided with a groove $f^5$ to receive the glasses $d$ and the elastic pad $a^2$ is not recessed around the window opening. The glass may be solutioned in the groove $f^5$ or not, as desired.

The construction shown in Fig. 11 differs from that shown in Fig. 10 in that the elastic pad $a^2$ is provided with a groove or recess $e$ and the grooved portion of the band or support $f^6$ is seated in the groove or recess $e$.

Fig. 12 illustrates a construction like that shown in Fig. 11 except that the beaded portion $f^6$ of the band or support is made hollow at $f^7$ and the principal object thereof is to increase the elasticity of the band, where required, for facilitating the insertion and removal of the glasses $d$.

Referring to Fig. 13, the glass $d$ is kept in place by an oblong strip $v$ of india rubber or the like between the band or support $f^2$ and the resilient pad $a^2$, the said strip having a hole nearly as large as the outer contour of the glass $d$ and is furnished with a bead or fillet $v'$ which engages in the recess $e$ in the resilient pad and with the glass $d$. The strip $v$ is reduced in thickness toward its outer edge.

In the construction shown in Fig. 14, the perforated strip $v^2$ is thickened at its inner edge to form a bead to engage in the recess $e$ around the opening in the resilient pad $a^2$ and is furthermore provided with a groove $v^3$ to accommodate the glass $d$.

Fig. 15 resembles Fig. 14, except that the perforated strip $v^4$ has an L-shaped flange $v^5$ instead of a grooved bead and, consequently, the retention in place of the glass $d$ also depends, to a great extent, upon the band or support $f^2$ overlapping the glass $d$.

As shown in Figs. 16 and 17, the thickened portion $a^4$ of the resilient pad $a$ may also have a piece $w$ of metal or hard material embedded therein to form an additional protection against damage to the wearer's nose and the two lateral extensions $w'$ also serve to protect the brow and eyes. As shown, this protecting piece is covered by the band or support $f^2$. It is, however, obvious that the protecting device $w$ may also be embedded in, or fixed to, the band or support $f^2$.

As shown in Fig. 18, the resilient pad $a$ may be furnished with holes or ducts $o$ for the ventilation of the spaces between the wearer's eyes and the glasses or windows $d$ and in order that these holes should not become closed owing to the deformation of the resilient pad when on the wearer's head, these holes may be reinforced or lined with small corrugated tubes $p$ or wire coils. The holes or one of them may also be provided with a small cowl such as marked $q$ to assist the ventilation.

Or, as shown in Figs. 19, 20 and 21, the resilient pad $a^3$ is made somewhat thicker and recessed to receive two pieces of corrugated tubing $p'$ and $p^2$ and one end of each piece of tube projects into a hole or duct $o$ molded in the pad $a^3$. The tubes $p'$ and $p^2$ are suitably perforated with a number of small holes $p^3$ and their inner ends may be closed or open. The glasses $d$ are conveniently mounted as described with reference to Fig. 11.

As previously indicated, the goggles may also be adapted to serve as or be combined with a gas mask and as shown in Fig. 22 a respirator $r$ of known construction is suspended in a cradle $s$ furnished with two straps $s'$ provided with button holes adapted to button on to a stud $t$ (see also Fig. 6). The nose clip is conveniently formed by the projections, such as $b'$ $b'$ (Figs. 2, 3 and 4) integral with the resilient pad $a$, or, of course, a separate nose clip of known construction may be employed so that, in any case, the wearer can only inhale through the mouthpiece of the respirator which is held in his mouth. Telephone receivers $x$ may easily be applied to the straps $h$ $h'$ by providing them with eyes or loops which are adapted to slide on the said straps, so that the ears may always be properly covered by the receivers whether the person's ears be set relatively far back or forward on his head.

Owing to the weight of the receivers it may be advisable to provide the harness, as shown in Fig. 23, with a strap $y$ passing over the wearer's head and connecting the straps $h$ $h'$ on both sides thereof, and in this case, in addition to the telephone receiver $x$, a telephone mouthpiece or transmitter 1 is shown suspended around the neck by means of straps 2 fastened to a stud 3 on the pad $m$. If desired, the strap 2 may have a hook or hooks and an eye or eyes or other appropriate device or devices for varying the length of the strap so as to reduce the distance of the transmitter from the mouth of the wearer, if necessary.

If desired and as shown, the straps $h$ $h'$ are detachably connected to the band or support $f$ by providing the latter with studs $z$ and the straps are correspondingly furnished with button holes.

I claim:

1. Goggles comprising a solid resilient facial pad molded with eye apertures and so formed that its inner surface closely fits the features of the upper portion of the face and nose and its outer surface presents faces which are substantially right-angularly disposed to each other, and flat goggle glasses mounted in said eye apertures parallel to the said right-angularly disposed faces of the pad, substantially as set forth.

2. Goggles comprising a solid resilient facial pad molded with eye apertures and so formed that its inner surface conforms to the features of the upper portion of the face and nose and its outer surface presents faces which are substantially right-angularly disposed to each other, recesses formed in said pad around the eye apertures and flat goggle glasses mounted in said recesses parallel to the said right-angularly disposed faces of the pad, substantially as set forth.

3. Goggles comprising a solid resilient facial pad molded with eye apertures and so formed that its inner surface conforms to the features of the upper portion of the face and nose and its outer surface presents faces which are substantially right-angularly disposed to each other, flat goggle glasses mounted in said eye apertures parallel to the said right-angularly disposed faces of the pad, ducts in said pad for ventilating the spaces intermediate of the glasses and eyes, and means for securing the pad to the wearer's head, substantially as set forth.

4. Goggles comprising a solid resilient facial pad molded with eye apertures and so formed that its inner surface conforms to the features of the upper portion of the face and nose, goggle glasses mounted in said eye apertures, and a strengthening band for the pad which also serves to retain the glasses in the eye apertures, substantially as set forth.

5. Goggles comprising a solid resilient facial pad molded with eye apertures and so formed that its inner surface conforms to the features of the upper portion of the face and nose, a protecting sheath in said pad in front of the wearer's nose and provided with lateral extensions to protect the brow and eyes, goggle glasses mounted in said eye apertures, and means for securing the pad to the wearer's head, substantially as set forth.

6. Goggles comprising in combination a resilient facial pad molded so that its inner surface substantially fits against the brow and nose and around the eye sockets of the wearer and provided with eye apertures extending from the inner corner of the eye to some distance to the rear of the outer corner thereof, means for receiving and retaining glasses in the said apertures clear of the eyelashes of the wearer and substantially at an angle of 90° to each other, a strengthening band molded to fit on the front of and fixed to the said pad, a plurality of securing straps adapted to pass respectively over and under one ear of the wearer and each of which is connected at one end to one end of the said band and at the other end to a rear pad adapted to fit against the back of the wearer's head, a second plurality of securing straps adapted to pass respectively over and under the other ear of the wearer and each of which is connected at one end to the other end of the said band and at the other end to the said rear pad, and a flexible strut connecting each upper securing strap with a lower securing strap in the vicinity of the ear of the wearer, substantially as set forth.

EDWARD THOMAS PARSONS GOODYEAR.